(12) United States Patent
Shen et al.

(10) Patent No.: US 10,979,166 B2
(45) Date of Patent: Apr. 13, 2021

(54) METHOD FOR AVOIDING TRANSMISSION OF SIDE INFORMATION BY PTS IN COMBINATION WITH CHANNEL ESTIMATION

(71) Applicant: THE 28TH RESEARCH INSTITUTE OF CHINA ELECTRONICS TECHNOLOGY GROUP CORPORATION, Nanjing (CN)

(72) Inventors: Xiaoping Shen, Nanjing (CN); Yang Zhou, Nanjing (CN); Xin Ding, Nanjing (CN); Ning Xu, Nanjing (CN)

(73) Assignee: THE 28TH RESEARCH INSTITUTE OF CHINA ELECTRONICS TECHNOLOGY GROUP CORPORATION, Nanjing (CN)

( * ) Notice: Subject to any disclaimer, the term of this patent is extended or adjusted under 35 U.S.C. 154(b) by 77 days.

(21) Appl. No.: 16/490,088

(22) PCT Filed: Dec. 26, 2017

(86) PCT No.: PCT/CN2017/118769
§ 371 (c)(1),
(2) Date: Aug. 30, 2019

(87) PCT Pub. No.: WO2019/075918
PCT Pub. Date: Apr. 25, 2019

(65) Prior Publication Data
US 2020/0014482 A1 Jan. 9, 2020

(30) Foreign Application Priority Data
Oct. 19, 2017 (CN) .......................... 201710976872.5

(51) Int. Cl.
*H04L 27/26* (2006.01)
*H04J 11/00* (2006.01)
(Continued)

(52) U.S. Cl.
CPC ........ *H04J 11/0066* (2013.01); *H04L 25/022* (2013.01); *H04L 25/03828* (2013.01); *H04L 27/2621* (2013.01)

(58) Field of Classification Search
CPC ............ H04J 11/0066; H04L 25/03828; H04L 25/022; H04L 27/2621
See application file for complete search history.

(56) References Cited

U.S. PATENT DOCUMENTS

2011/0273999 A1* 11/2011 Nagaraja ................ H04L 1/0076
370/252
2014/0219324 A1* 8/2014 Arambepola ........... H04L 27/26
375/226

\* cited by examiner

*Primary Examiner* — Jamal Javaid
(74) *Attorney, Agent, or Firm* — CBM Patent Consulting, LLC

(57) ABSTRACT

A method for avoiding transmission of side information by a Partial Transmit Sequence, comprising the following steps: Step 1: determining an indication sequence of a data sub-carrier and a pilot sub-carrier; Step 2: grouping the frequency domain data blocks including data and pilots to reduce the peak-to-average power ratio (PAPR) of the OFDM signal by phase rotation according to the PTS method. Step 3: processing the pilot of the received signal through channel estimation based on fast Fourier transform interpolation to obtain a frequency domain channel response, and extracting a phase rotation sequence. Step 4: equalizing the received data through the obtained frequency domain channel response. Step 5: performing inverse rotation of phase on the equalized data through the phase rotation information extracted in Step 3 to obtain transmitted data symbols.

5 Claims, 1 Drawing Sheet

(51) Int. Cl.
*H04L 25/02* (2006.01)
*H04L 25/03* (2006.01)

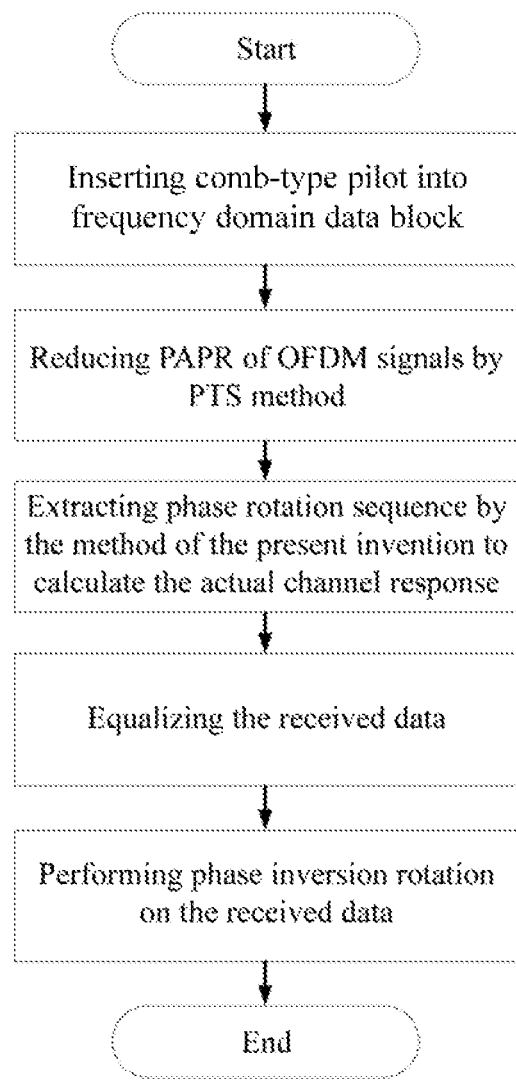

METHOD FOR AVOIDING TRANSMISSION OF SIDE INFORMATION BY PTS IN COMBINATION WITH CHANNEL ESTIMATION

TECHNICAL FIELD

The invention relates to the technical field of wireless and wired communication based on an Orthogonal Frequency Division Multiplexing (OFDM) system, in particular to a method for avoiding transmission of side information by a Partial Transmit Sequence (PTS).

BACKGROUND

Orthogonal Frequency Division Multiplexing (OFDM) technology has the characteristics of resisting multipath interference and can perform data transmission on non-contiguous sub-bands. These two important features make OFDM become the physical layer standard technology for 4G and 5G. However, some challenging problems remain unsolved in the OFDM system, one of which is the Peak to Average Power Ratio (PAPR) of OFDM signals. Generally, a high power amplifier has the highest output power efficiency when operating in or near a saturation region. Due to the high PAPR of the input signal, memoryless nonlinear distortion will be introduced into the communication channel, resulting in out-of-band spectral regeneration and bit error rate (BER) of the system. Therefore, in OFDM wireless communication systems, it is very important to reduce the high PAPR of the signal.

One of the main methods to reduce the PAPR of traditional OFDM signals is Partial Transmit Sequence (PTS) method. The PTS method divides the frequency domain data blocks, then transforms each block into time domain by Inverse fast Fourier transform (IFFT), multiplies each time domain signal by a different phase rotation coefficient, and finally selects a signal with the lowest PAPR and sends it out. Due to the phase rotation of the frequency domain data, the transmitter must use some sub-carriers to send the phase rotation information (side information) to the receiver to recover the data. The transmission of side information will first cause the loss of data rate, and secondly, if the side information cannot be recovered correctly at the receiver, BER will deteriorate dramatically.

SUMMARY OF THE INVENTION

Purpose of the invention: aiming at the problem that the PTS needs to transmit side information to reduce the PAPR of the OFDM signal, the invention provides a method for avoiding transmission of side information by a PTS in combination with channel estimation. The method reduces the PAPR of the OFDM signal and does not need to transmit side information, thereby ensuring the spectral efficiency and the bit error rate performance of the system not to be affected.

The invention claims a method for avoiding transmission of side information by a PTS in combination with channel estimation, comprising the following steps:

Step 1: the transmitter determines an indication sequence of the data sub-carrier and the pilot sub-carrier;

Step 2: the frequency domain data blocks including data and pilots are grouped, and the peak-to-average power ratio (PAPR) of the orthogonal frequency division multiplexing (OFDM) signal is reduced by phase rotation according to a Partial Transmit Sequence (PTS) method;

Step 3: processing the pilot of the received signal through channel estimation based on fast Fourier transform (FFT) interpolation to obtain a frequency domain channel response, and extracting a phase rotation sequence of the transmitter;

Step 4: equalizing the received data through the obtained frequency domain channel response;

Step 5: performing inverse rotation of phase on the equalized data through the phase rotation information extracted in Step 3 to obtain the transmitted data symbols.

In Step 1, the frequency domain data block is denoted as $X=[X(0), X(1), \ldots, X(N-1)]^*$, N is the number of sub-carriers, * is transposition, X has N data and includes $L=N/4$ pilots and N−L quadrature amplitude modulation (QAM) symbols, L pilots are arranged on the 4lth sub-carrier, $l=0, 1, \ldots L-1$, and N−L QAM symbols are arranged on other N−L sub-carriers.

Step 2 includes the following steps:

Step 21, dividing the frequency domain data block X into M subblocks, shown as:

$$X = \sum_{m=0}^{M-1} X^m,$$

wherein M=4, $X^m=[X_0^m, X_1^m, \ldots, X_{N-1}^m]$ represents the mth subblock, $m=0, 1, \ldots, M-1$, the mth subblock $X^m$ where, the data $X_k^m$ on k sub-carriers are shown as:

$$X_k^m = \begin{cases} X_k, & mN/M \leq k < (m+1)N/M \\ 0, & \text{others} \end{cases}$$

transforming $X^m$ to time domain through N IFFT to obtain the mth time domain signal $x^m$, shown as:

$$x^m=[x^m(0), x^m(1), \ldots, x^m(N-1)],$$

where, $x^m(N-1)$ represents the N−1th data of $x^m$ in the time domain;

Step 22, producing a set $\Psi$ containing $U=4^M$ phase rotation sequences $\Omega_u$, shown as:

$$\Omega_u=[W_u^0, W_u^1, \ldots, W_u^{M-1}], u=0,1, \ldots, U-1,$$

where $W_u^m \in \{1,-1,j,-j\}$, u represents the uth, $W_u^m$ is a phase rotation coefficient, $j=\sqrt{-1}$;

Step 23, according to U different phase rotation sequences $\Omega_u$, performing phase rotation on $x^m$ to obtain U candidate signals $\tilde{x}_u$, shown as:

$$\tilde{x}_u = \sum_{m=0}^{M-1} W_u^m x^m,$$

where, $\tilde{x}_u=[\tilde{x}_u(0), \tilde{x}_u(1), \ldots, \tilde{x}_u(N-1)]$ represents the uth candidate signal $\tilde{x}_u$, calculating the $PAPR_u$ of U candidate signals, shown as:

$$PAPR_u = \frac{\max_{0 \leq n \leq N-1}[|\tilde{x}_u|^2]}{E[|\tilde{x}_u|^2]},$$

where, n represents the nth point, $0 \leq n \leq N-1$, $|\tilde{x}_u|$ is the absolute value of $\tilde{x}_u$, and $E[|\tilde{x}_u|^2]$ is the average value of $|\tilde{x}_u|^2$;

Step 24, indicating the minimum PAPR as PAPR*, indicating the signals of decreased PAPR as signal $\tilde{x}*$, indicating the corresponding phase rotation sequence as W*, and sending signals $\tilde{x}*$.

Step 3 includes the following steps:

Step 31, indicating the received signals as $r=[r(0), r(1), \ldots, r(N-1)]$, where $r(N-1)$ represents the N-1th data in r, transforming the received signals r to frequency domain through fast Fourier transform (FFT) of N point to obtain frequency domain data block $R=[R(0), R(1), \ldots, R(N-1)]$, where $R(N-1)$ is the N-1th data of frequency domain data block R, $R(k)=\hat{X}(k)H(k)+W(k)$, $R(k)$ is the kth data of frequency domain data block R, $0 \leq k \leq N-1$, $H(k)$ and $W(k)$ are frequency domain channel response and noise on the kth sub-carrier respectively, and $\hat{X}(k)$ is the data after phase rotation on the kth sub-carrier; Step 32, calculating the rotation channel response $\hat{H}=[\hat{H}_{4\times 0}, \hat{H}_{4\times 1}, \ldots, \hat{H}_{4\times(L-1)}]$ on L pilot sub-carriers through the pilot, shown as:

$$\hat{H}_k = \frac{R(k)}{X_p(k)}, k = 4l, l = 0, 1, \ldots, L-1,$$

where, $X_p(k)$ is the pilot on the kth sub-carrier;

Step 33, dividing rotation channel response $\hat{H}$ into M groups, shown as:

$$\hat{H} = \sum_{m=0}^{M-1} \hat{H}^m,$$

where $\hat{H}^m=[\hat{H}_0^m, \hat{H}_1^m, \ldots, \hat{H}_{L-1}^m]$ represents the mth group, the length is L, $\hat{H}_l^m$ represents the lth point in $\hat{H}^m$, $0 \leq l \leq L-1$ and $\hat{H}_l^m$ are shown as:

$$\hat{H}_l^m = \begin{cases} \hat{H}_{l*L/M}, & mL/M \leq l < (m+1)L/M \\ 0, & \text{others} \end{cases}$$

utilizing L point IFFT to transform $\hat{H}^m$ to time domain to obtain the channel rotation impulse response $\hat{h}^m=[\hat{h}^m(0), \hat{h}^m(1), \ldots, \hat{h}^m(L-1)]$ corresponding to $\hat{H}^m$, where $\hat{h}^m(L-1)$ represents the L-1th data in $\hat{h}^m$;

Step 34, performing phase inverse rotation on $\hat{h}^m$, $m=0, 1, \ldots, M-1$ through phase inverse rotation sequence $\Omega'_u$ to obtain U candidate signals, shown as:

$$\tilde{h}_u = \sum_{m=0}^{M-1} W_u'^m \hat{h}^m, u = 0, 1, \ldots, U-1,$$

where, ' is conjugate, $\Omega'_u$ is the vector of conjugate of $\Omega_u$, $\tilde{h}_u=[\tilde{h}_u(0), \tilde{h}_u(1), \ldots, \tilde{h}_u(L-1)]$, calculating the minimum Tail$_u$ of $\tilde{h}_u$ tail signal, shown as $$Tail_u = \min_{L-Q \leq n \leq L-1} |\tilde{h}_u|,$$

where, Q is an integer and is set to Q=4;

Step 35, indicating the minimum Tail$_u$ as Tail*, and indicating the corresponding phase inversion rotation sequence as $\Omega'*$;

Step 36, calculating the actual channel impulse response $$\hat{h} = \sum_{m=0}^{M-1} W_*'^m \hat{h}^m$$

through $\Omega'*=[W*'^0, W*'^1, \ldots, W*'^{M-1}]$, adding (N-L) zeros behind $\hat{h}$ to obtain $$h = [\hat{h}, \underbrace{0, 0, \ldots, 0}_{N-L}],$$

and working out FFT of N point on h to obtain channel response $\overline{H}=[\overline{H}(0), \overline{H}(1), \ldots, \overline{H}(N-1)]$ on N sub-carriers, where $\overline{H}(N-1)$ is the N-1th data in $\overline{H}$.

In Step 4, zero-forcing equalization (ZF) or minimum mean square error equalization (MMSE) are performed on frequency domain data to obtain transmitted data symbol blocks $\overline{X}=[\overline{X}(0), \overline{X}(1), \ldots, \overline{X}(N-1)]$, $\overline{X}(k)$ represents the kth data in $\overline{X}$, and $0 \leq k \leq N-1$, and $\overline{X}(k)$ are shown as:

$$\overline{X}(k) = \begin{cases} \dfrac{R(k)}{\overline{H}(k)}, & ZF \\ \dfrac{R(k) \times \overline{H}'(k)}{|\overline{H}(k)|^2 + \gamma}, & MMSE \end{cases},$$

where, $\gamma$ is reciprocal of signal-to-noise ratio.

Step 5 includes the following steps:

Step 51, dividing $\overline{X}$ into M subblocks, shown as:

$$\overline{X} = \sum_{m=0}^{M-1} \overline{X}^m,$$

where, $\overline{X}^m=[\overline{X}^m(0), \overline{X}^m(1), \ldots, \overline{X}^m(N-1)]$ is the mth subblock, shown as:

$$\overline{X}_k^m = \begin{cases} \overline{X}_k, & mN/M \leq k < (m+1)N/M \\ 0, & \text{others} \end{cases}$$

where, $\bar{X}_k^m$ represents the data on the kth sub-carrier in $\bar{X}^m$ of the mth subblock, Step 52: performing phase inversion rotation of $\bar{X}^m$ to obtain transmitted data block X, shown as:

$$X = \sum_{m=0}^{M-1} W_*^m \bar{X}^m.$$

BRIEF DESCRIPTION OF DRAWINGS

The advantages of the above and/or other aspects of the present invention will become more apparent from the following further detailed description of the invention when taken in conjunction with the accompanying drawings and specific embodiments.

FIG. 1 is a flowchart of the present invention.

DETAILED DESCRIPTION OF EMBODIMENTS

As shown in FIG. 1, the invention provides a method for avoiding transmission of side information by a PTS in combination with channel estimation, including the following steps:

Step 1: the transmitter determines an indication sequence of the data sub-carrier and the pilot sub-carrier;

Step 2: grouping frequency domain data blocks including data and pilots, and reducing the PAPR of the OFDM signal by phase rotation according to the PTS method;

Step 3: processing pilot of the received signal through channel estimation based on fast Fourier transform (FFT) interpolation to obtain a frequency domain channel response, and extracting a phase rotation sequence of the transmitter;

Step 4: equalizing the received data through the obtained frequency domain channel response;

Step 5: performing inverse rotation of phase on the equalized data through the phase rotation information extracted in Step 3 to obtain transmitted data symbols.

In Step 1, the frequency domain data block is denoted as $X=[X(0), X(1), \ldots, X(N-1)]^*$, N is the number of sub-carriers, * is transposition, X has N data and includes L=N/4 pilots and N−L quadrature amplitude modulation (QAM) symbols, L pilots are arranged on the 4lth sub-carrier, l=0, 1, ... L−1, and N−L QAM symbols are arranged on other N−L sub-carriers.

Step 2 includes the following steps:

Step 21, dividing the frequency domain data block X into M subblocks, shown as:

$$X = \sum_{m=0}^{M-1} X^m,$$

where, M=4, $X^m=[X_0^m, X_1^m, \ldots, X_{N-1}^m]$ represents the mth subblock, m=0, 1, ..., M−1, the mth subblock $X^m$ where, the data $X_k^m$ on k sub-carriers are shown as:

$$X_k^m = \begin{cases} X_k, & mN/M \le k < (m+1)N/M \\ 0, & \text{others} \end{cases}$$

transforming $X^m$ to time domain through N IFFT to obtain the mth time domain signal $x^m$, shown as:

$$x^m=[x^m(0),x^m(1), \ldots, x^m(N-1)],$$

where, $x^m(N-1)$ represents the N−1th data of $x^m$ in the time domain;

Step 22, producing a set $\Psi$ containing $U=4^M$ phase rotation sequences $\Omega_u$, shown as:

$$\Omega_u=[W_u^0, W_u^1, \ldots, W_u^{M-1}], u=0,1,\ldots,U-1,$$

where $W_u^m \in \{1,-1, j,-j\}$, u represents the uth, $W_u^m$ is a phase rotation coefficient, $j=\sqrt{-1}$;

Step 23, according to U different phase rotation sequences $\Omega_u$, performing phase rotation on $x^m$ to obtain U candidate signals $\tilde{x}_u$, shown as:

$$\tilde{x}_u = \sum_{m=0}^{M-1} W_u^m x^m,$$

where, $\tilde{x}_u=[\tilde{x}_u(0), \tilde{x}_u(1), \ldots, \tilde{x}_u(N-1)]$ represents the uth candidate signal $\tilde{x}_u$, calculating the $PAPR_u$ of U candidate signals, shown as:

$$PAPR_u = \frac{\max_{0 \le n \le N-1}[|\tilde{x}_u|^2]}{E[|\tilde{x}_u|^2]},$$

where, n represents the nth point, $0 \le n \le N-1$, $|\tilde{x}_u|$ is the absolute value of $\tilde{x}_u$, and $E[|\tilde{x}_u|^2]$ is the average value of $|\tilde{x}_u|^2$;

Step 24, indicating the minimum $PAPR_u$ as PAPR*, indicating the signals of decreased PAPR as signal $\tilde{x}^*$, indicating the corresponding phase rotation sequence as W*, and sending signals $\tilde{x}^*$.

Step 3 includes the following steps:

Step 31, indicating the received signals as $r=[r(0), r(1), \ldots, r(N-1)]$, where $r(N-1)$ represents the N−1th data in r, transforming the received signals r to frequency domain through fast Fourier transform (FFT) of N point to obtain frequency domain data block $R=[R(0), R(1), \ldots, R(N-1)]$, where $R(N-1)$ is the N−1th data of frequency domain data block R, $R(k)=\hat{X}(k)H(k)+W(k)$, R(k) is the kth data of frequency domain data block R, $0 \le k \le N-1$, H(k) and W(k) are frequency domain channel response and noise on the kth sub-carrier respectively, and $\hat{X}(k)$ is the data after phase rotation on the kth sub-carrier;

Step 32, calculating the rotation channel response $\hat{H}=[\hat{H}_{4\times 0}, \hat{H}_{4\times 1}, \ldots, \hat{H}_{4\times(L-1)}]$ on L pilot sub-carriers through the pilot, shown as:

$$\hat{H}_k = \frac{R(k)}{X_p(k)}, k = 4l, l = 0, 1, \ldots, L-1,$$

where, $X_p(k)$ is the pilot on the kth sub-carrier;

Step 33, dividing rotation channel response $\hat{H}$ into M groups, shown as:

$$\hat{H} = \sum_{m=0}^{M-1} \hat{H}^m,$$

where $\hat{H}^m = [\hat{H}_0^m, \hat{H}_1^m, \ldots, \hat{H}_{L-1}^m]$ represents the mth group, the length is L, $\hat{H}_l^m$ represents the lth point in $\hat{H}^m$, $0 \leq l \leq L-1$ and $\hat{H}_l^m$ are shown as:

$$\hat{H}_l^m = \begin{cases} \hat{H}_{l*L/M}, & mL/M \leq l < (m+1)L/M \\ 0, & \text{others} \end{cases}$$

utilizing L point IFFT to transform $\hat{H}^m$ to time domain to obtain the channel rotation impulse response $\hat{h}^m = [\hat{h}^m(0), \hat{h}^m(1), \ldots, \hat{h}^m(L-1)]$ corresponding to $\hat{H}^m$, where $\hat{h}^m(L-1)$ represents the L-1th data in $\hat{h}^m$;

Step 34, performing phase inverse rotation on $\hat{h}^m$, m=0, 1, ..., M-1 through phase inverse rotation sequence $\Omega'_u$ to obtain U candidate signals, shown as:

$$\tilde{h}_u = \sum_{m=0}^{M-1} W_u'^m \hat{h}^m, u = 0, 1, \ldots, U-1,$$

where, ' is conjugate, $\Omega'_u$ is the vector of conjugate of $\Omega_u$, $\tilde{h}_u = [\tilde{h}_u(0), \tilde{h}_u(1), \ldots, \tilde{h}_u(L-1)]$, calculating the minimum $\text{Tail}_u$ of $\tilde{h}_u$ tail signal, shown as $$\text{Tail}_u = \min_{L-Q \leq n \leq L-1} |\tilde{h}_u|,$$

where, Q is an integer and is set to Q=4;

Step 35, indicating the minimum $\text{Tail}_u$ as $\text{Tail}^*$, and indicating the corresponding phase inversion rotation sequence as $\Omega^*$;

Step 36, calculating the actual channel impulse response $$\hat{h} = \sum_{m=0}^{M-1} W_*'^m \hat{h}^m$$

through $\Omega'^* = [W^{*'0}, W^{*'1}, \ldots, W^{*'M-1}]$, adding (N-L) zeros behind $\hat{h}$ to obtain $$h = [\hat{h}, \underbrace{0, 0, \ldots, 0}_{N-L}],$$

and working out FFT of N point on h to obtain channel response $\bar{H} = [\bar{H}(0), \bar{H}(1), \ldots, \bar{H}(N-1)]$ on N sub-carriers, where $\bar{H}(N-1)$ is the N-1th data in $\bar{H}$.

In Step 4, zero-forcing equalization (ZF) or minimum mean square error equalization (MMSE) are performed on frequency domain data to obtain transmitted data symbol blocks $\bar{X} = [\bar{X}(0), \bar{X}(1), \ldots, \bar{X}(N-1)]$, $\bar{X}(k)$ represents the kth data in $\bar{X}$, and $0 \leq k \leq N-1$, and $\bar{X}(k)$ are shown as:

$$\bar{X}(k) = \begin{cases} \dfrac{R(k)}{\bar{H}(k)}, & ZF \\ \dfrac{R(k) \times \bar{H}'(k)}{|\bar{H}(k)|^2 + \gamma}, & MMSE \end{cases},$$

where, $\gamma$ is reciprocal of signal-to-noise ratio.

Step 5 includes the following steps:
Step 51, dividing $\bar{X}$ into M subblocks, shown as:

$$\bar{X} = \sum_{m=0}^{M-1} \bar{X}^m,$$

where, $\bar{X}^m = [\bar{X}^m(0), \bar{X}^m(1), \ldots, \bar{X}^m(N-1)]$ is the mth subblock, shown as:

$$\bar{X}_k^m = \begin{cases} \bar{X}_k, & mN/M \leq k < (m+1)N/M \\ 0, & \text{others} \end{cases}$$

where, $\bar{X}_k^m$ represents the data on the kth sub-carrier in $\bar{X}^m$ of the mth subblock, Step 52: performing phase inversion rotation of $\bar{X}^m$ to obtain transmitted data block X, shown as:

$$X = \sum_{m=0}^{M-1} W_*^m \bar{X}^m.$$

The present invention will be described in more detail below by way of embodiments, but the following examples are merely illustrative and the scope of protection of the present invention is not limited by these embodiments.

Embodiment 1

Parameter Description:

In Step 1, the number of sub-carriers of the system is N=1024, the number of pilots is L=256, and the constellation mapping mode is 4QAM;

In Step 2, M=4: the frequency domain data block is divided into 4 subblocks, and the number of phase rotation sequences is U=256; after phase rotation of the frequency domain data block, 256 different candidate sequences are obtained, and then the sequence with the lowest PAPR is selected as an optimal sequence, which is then sent out;

In Step 3, the 256-point pilot is used to estimate the channel response in frequency domain, and the 256-point channel response is divided into 4 groups; then the channel response in frequency domain is inversely rotated by U=256 inverted phase rotation sequences, and the phase rotation sequences of the transmitter are extracted to obtain the actual channel response;

In Step 4, equalizing the frequency domain data blocks according to the real channel response;

In Step 5, dividing the equalized frequency domain data block into 4 subblocks, and performing phase inverse rotation on the subblocks.

The simulation results show that the invention can ensure that the BER is not affected while ensuring the performance of the PAPR reduction, meanwhile avoiding the transmission of the side information, thereby improving the throughput of the system.

The PAPR can be reduced by 5.5 dB, and the SNR is 12 dB when BER=$10^{-5}$. The data rate and the bit error rate performance of the present invention after decreasing PAPR are the same as those of the signals before decreasing the PAPR.

The foregoing is only a preferred embodiment of the present invention, but the present invention should not be limited to the contents disclosed in this embodiment and the accompanying drawings. Therefore, equivalents or modifications made without departing from the spirit of the present invention shall fall within the scope of the present invention.

What is claimed is:

1. A method for avoiding transmission of side information by a PTS in combination with channel estimation, comprising the following steps:

Step 1: a transmitter determines an indication sequence of a data sub-carrier and a pilot sub-carrier;

Step 2: a frequency domain data block comprising data and pilots are grouped, and peak-to-average power ratio (PAPR) of an orthogonal frequency division multiplexing (OFDM) signal is reduced by phase rotation according to a Partial Transmit Sequence (PTS) method;

wherein, the frequency domain data block is denoted as $X=[X(0), X(1), \ldots, X(N-1)]^*$, N is the number of sub-carriers, * is transposition, X has N data and comprises L=N/4 pilots and N−L quadrature amplitude modulation (QAM) symbols, L pilots are arranged on the 4lth sub-carrier, l=0, 1, ... L−1, and N−L QAM symbols are arranged on other N−L sub-carriers;

Step 3: processing the pilot of the received signal through channel estimation based on fast Fourier transform (FFT) interpolation to obtain a frequency domain channel response, and extracting a phase rotation sequence of the transmitter;

Step 4: equalizing the received data through the obtained frequency domain channel response;

Step 5: performing inverse rotation of phase on the equalized data through the phase rotation information extracted in Step 3 to obtain transmitted data symbols.

2. The method for avoiding transmission of side information by a PTS in combination with channel estimation according to claim 1, wherein Step 2 comprises the following steps:

Step 21, dividing the frequency domain data block X into M subblocks, shown as:

$$X = \sum_{m=0}^{M-1} X^m,$$

where, M=4, $X^m=[X_0^m, X_1^m, \ldots, X_{N-1}^m]$ repesents the mth subblock, m=0, 1, ..., M−1, the mth subblock $X^m$ where, the data $X_k^m$ on k sub-carriers are shown as:

$$X_k^m = \begin{cases} X_k, & mN/M \leq k < (m+1)N/M \\ 0, & \text{others} \end{cases}$$

transforming $X^m$ to time domain through N IFFT to obtain the mth time domain signal $x^m$, shown as:

$$x^m=[x^m(0), x^m(1), \ldots, x^m(N-1)],$$

where, $x^m(N-1)$ represents the N−1th data of $x^m$ in the time domain;

Step 22, producing a set Ψ containing $U=4^M$ phase rotation sequences $\Omega_u$, shown as:

$$\Omega_u=[W_u^0, W_u^1, \ldots, W_u^{M-1}], u=0,1,\ldots,U-1,$$

where $W_u^m \in \{1,-1,j,-j\}$, u represents the uth, $W_u^m$ d is a phase rotation coefficient, $j=\sqrt{-1}$;

Step 23, according to U different phase rotation sequences $\Omega_u$, performing phase rotation on $x^m$ to obtain U candidate signals $\tilde{x}_u$, shown as:

$$\tilde{x}_u = \sum_{m=0}^{M-1} W_u^m x^m,$$

where, $\tilde{x}_u=[\tilde{x}_u(0), \tilde{x}_u(1), \ldots, \tilde{x}_u(N-1)]$ represents the uth candidate signal $\tilde{x}_u$, calculating the $PAPR_u$ of U candidate signals, shown as:

$$PAPR_u = \frac{\max_{0 \leq n \leq N-1} [|\tilde{x}_u|^2]}{E[|\tilde{x}_u|^2]},$$

where, n represents the nth point, $0 \leq n \leq N-1$, $|\tilde{x}_u|$ is the absolute value of $\tilde{x}_u$, and $E[|\tilde{x}_u|^2]$ is the average value of $|\tilde{x}_u|^2$;

Step 24, indicating the minimum $PAPR_u$ as PAPR*, indicating the signals of decreased PAPR as signal $\tilde{x}$*, indicating the corresponding phase rotation sequence as W*, and sending signals $\tilde{x}$*.

3. The method for avoiding transmission of side information by a PTS in combination with channel estimation according to claim 2, wherein Step 3 comprises the following steps:

Step 31, indicating the received signals as $r=[r(0), r(1), \ldots, r(N-1)]$, where r(N−1) represents the N−1th data in r, transforming the received signals r to frequency domain through fast Fourier transform (FFT) of N point to obtain frequency domain data block $R=[R(0), R(1), \ldots, R(N-1)]$, where R(N−1) is the N−1th data of frequency domain data block R, $R(k)=\hat{X}(k)H(k)+W(k)$, R(k) is the kth data of frequency domain data block R, $0 \leq k \leq N-1$, H(k) and W(k) are frequency domain channel response and noise on the kth sub-carrier respectively, and $\hat{X}(k)$ is the data after phase rotation on the kth sub-carrier;

Step 32, calculating the rotation channel response $\hat{H}=[\hat{H}^{4\times 0}, \hat{H}_{4\times 1}, \ldots, \hat{H}_{4\times(L-1)}]$ on L pilot sub-carriers through the pilot, shown as:

$$\hat{H}_k = \frac{R(k)}{X_p(k)},$$

$$k = 4l, l = 0, 1, \ldots, L-1,$$

where, $X_p(k)$ is the pilot on the kth sub-carrier;

Step 33, dividing rotation channel response $\hat{H}$ into M groups, shown as:

$$\hat{H} = \sum_{m=0}^{M-1} \hat{H}^m,$$

where $\hat{H}^m=[\hat{H}_0^m, \hat{H}_1^m, \ldots, \hat{H}_{L-1}^m]$ represents the mth group, the length is L, $\hat{H}_l^m$ represents the lth point in $\hat{H}^m$, $0 \leq l \leq L-1$ and $\hat{H}_l^m$ are shown as:

$$\hat{H}_i^m = \begin{cases} \hat{H}_{l*L/M}, & mL/M \leq l < (m+1)L/M \\ 0, & \text{others} \end{cases}.$$

utilizing L point IFFT to transform $\hat{H}^m$ to time domain to obtain the channel rotation impulse response $\hat{h}^m=[\hat{h}^m(0), \hat{h}^m(1), \ldots, \hat{h}^m(L-1)]$ corresponding to $\hat{H}^m$, where $\hat{h}^m(L-1)$ represents the L-1th data in $\hat{h}^m$;

Step 34, performing phase inverse rotation on $\hat{h}^m$, m=0, 1, ..., M-1 through phase inverse rotation sequence $\Omega'_u$ to obtain U candidate signals, shown as:

$$\tilde{h}_u = \sum_{m=0}^{M-1} W_u'^m \hat{h}^m, u = 0, 1, \ldots, U-1,$$

where, ' is conjugate, $\Omega'_u$ is the vector of conjugate of $\Omega_u$, $\tilde{h}_u=[\tilde{h}_u(0), \tilde{h}_u(1), \ldots, \tilde{h}_u(L-1)]$, calculating the minimum $Tail_u$ of $\tilde{h}_u$ tail signal, shown as $$Tail_u = \min_{L-Q \leq n \leq L-1} |\tilde{h}_u|,$$

where, Q is an integer and is set to Q=4;

Step 35, indicating the minimum $Tail_u$ as Tail*, and indicating the corresponding phase inversion rotation sequence as $\Omega'^*$;

Step 36, calculating the actual channel impulse response $$\hat{h} = \sum_{m=0}^{M-1} W_*'^m \hat{h}^m$$

through $\Omega'^*=[W^{*'0}, W^{*'1}, \ldots, W^{*'M-1}]$, adding (N−L) zeros behind $\tilde{h}$ to obtain $$h = [\hat{h}, \underbrace{0, 0, \ldots, 0}_{N-L}],$$

and working out FFT of N point on h to obtain channel response $\overline{H}=[\overline{H}(0), \overline{H}(1), \ldots, \overline{H}(N-1)]$ on N sub-carriers, where $\overline{H}(N-1)$ is the N-1th data in $\overline{H}$.

4. The method for avoiding transmission of side information by a PTS in combination with channel estimation according to claim 3, wherein zero-forcing equalization (ZF) or minimum mean square error equalization (MMSE) are performed on frequency domain data to obtain transmitted data symbol blocks $\overline{X}=[\overline{X}(0), \overline{X}(1), \ldots, \overline{X}(N-1)]$, $\overline{X}(k)$ represents the kth data in $\overline{X}$, and $0 \leq k \leq N-1$, and $\overline{X}(k)$ are shown as:

$$\overline{X}(k) = \begin{cases} \dfrac{R(k)}{\overline{H}(k)} & ZF \\[6pt] \dfrac{R(k) \times \overline{H}'(k)}{|\overline{H}(k)|^2 + \gamma} & MMSE \end{cases},$$

where, $\gamma$ is reciprocal of signal-to-noise ratio.

5. The method for avoiding transmission of side information by a PTS in combination with channel estimation according to claim 4, wherein Step 5 comprises the following steps:

Step 51, dividing $\overline{X}$ into M subblocks, shown as:

$$\overline{X} = \sum_{m=0}^{M-1} \overline{X}^m,$$

where, $\overline{X}^m=[\overline{X}^m(0), \overline{X}^m(1), \ldots, \overline{X}^m(N-1)]$ is the mth subblock, shown as:

$$\overline{X}_k^m = \begin{cases} \overline{X}_k, & mN/M \leq k < (m+1)N/M \\ 0, & \text{others} \end{cases}$$

where, $\overline{X}_k^m$ represents the data on the kth sub-carrier in $\overline{X}^m$ of the mth subblock, Step 52: performing phase inversion rotation of $\overline{X}^m$ to obtain transmitted data block X, shown as:

$$X = \sum_{m=0}^{M-1} W_*^m \overline{X}^m.$$

\* \* \* \* \*